Inventor
Morton L. Weigel
By
Mason, Kolehmainen, Rathburn & Wyss
Attys

Inventor
Morton L. Weigel
By
Mason, Kolehmainen, Rathburn & Wyss
Attys

MAGNETIC TAPE APPARATUS WITH EQUALIZATION COMPENSATING MEANS

Filed July 22, 1965

Inventor:
Morton L. Weigel
By
Mason, Kolehmainen, Rathburn & Wyss
Attys

Inventor:
Morton L. Weigel
By Mason, Kolehmainen, Rathburn & Wyss
Att'ys

Inventor
Morton L. Weigel
By
Mason, Kolehmainen, Rathburn & Wyss
Att'ys.

3,439,127

MAGNETIC TAPE APPARATUS WITH EQUALIZATION COMPENSATING MEANS

Morton L. Weigel, Bloomington, Ind., assignor to Sarkes Tarzian, Inc., Bloomington, Ind., a corporation of Indiana Filed July 22, 1965, Ser. No. 473,921
Int. Cl. G11b 5/78
U.S. Cl. 179—100.2 9 Claims

ABSTRACT OF THE DISCLOSURE

A magnetic tape cartridge playing mechanism is provided whereby a number of individual magnetic tape cartridges may be played in rapid succession. The playing time of each cartridge is substantially extended by providing means for automatically measuring the amount of tape wound on the reel during each playing cycle of the mechanism and employing said measuring means to provide compensation electrically for the change in speed of the tape.

The present invention relates to magnetic tape recording and reproducing apparatus, and, more particularly, to apparatus for playing selections recorded on magnetic tape cartridges.

In certain types of magnetic tape cartridges, the magnetic tape is wound on the reel by means directly engaging the reel rather than with the conventional capstan and pressure roller which engages the tape intermediate the reel. One such arrangement is shown in a copending application of Morton L. Weigel, Ser. No. 389,014, which was filed Aug. 12, 1964, and is assigned to the same assignee as the present invention. In this copending application the magnetic tape moves past the transducer head at a constantly increasing speed due to the fact that the reel on which the tape is being wound is directly driven at a constant speed. The diameter of the tape reel and the length of tape are correlated with the speed of the tape so that the change in tape speed from the beginning to end of the tape does not produce a change in the level of the high frequency components of the reproduced selection which is of sufficient magnitude to be detected by the average listener. However, such an arrangement places a limitation on the length of tape which may be employed, and hence the length of selection which can be recorded in a particular magnetic tape cartridge.

While the arrangement disclosed in the above-identified copending application is entirely satisfactory for its intended purpose, under certain conditions it would be desirable to provide a somewhat longer length of tape in each magnetic tape cartridge so that a longer selection or greater number of selections could be recorded in a single cartridge, while at the same time retaining all of the advantages of flexibility in choice of selections and arrangement in the order of playing such selections. In addition, it is also desirable to provide for substantially instantaneous change from one magnetic tape cartridge to the other, and other advantages described in the above-identified copending application.

It is, therefore, an important object of the present invention to provide a magnetic tape cartridge changing mechanism wherein facilities are included for at least partially compensating for the change in tape speed as the tape within any particular cartridge is played.

It is another object of the present invention to provide a new and improved apparatus for playing magnetic tape cartridges wherein the tape speed varies during reproduction and means are provided for compensating at least partially for the change in tape speed as it is being played.

A further object of the present invention resides in the provision of a new and improved magnetic tape cartridge playing arrangement wherein facilities are provided for substantially and continuously modifying the electrical signal reproduced from the tape in order to at least partially compensate for the change in tape speed during the playing or reproducing of a recorded selection.

A further object of the present invention resides in the provision of a new and improved magnetic tape cartridge playing arrangement wherein the frequency characteristic of the playback amplifier is modified during playback of the recorded selection in order to provide at least partial compensation for the change in tape speed during playback of the recorded selection.

A still further object of the present invention resides in the provision of a new and improved mechanism for automatically changing magnetic tape cartridges and playing the same in succession wherein facilities are provided for at least partially compensating for change in speed of the tape in each cartridge as it is being played.

A still further object of the present invention resides in the provision of a new and improved automatic tape cartridge changing mechanism wherein facilities are provided for measuring the amount of tape wound on one of the reels of each cartridge as the selection recorded on said tape is reproduced and correspondingly modifying the reproduced signal to provide at least partial compensation for change in tape speed during said reproduction.

Briefly, in accordance with one phase of the present invention, a control member is provided which is moved during the playing cycle in accordance with the amount of tape wound on one reel of the magnetic tape cartridge. Movement of this control member is then employed to vary the frequency characteristic of the playback amplifier in which the signal reproduced from the tape is amplified so as to provide a substantially continuous compensation for the change in speed of the tape over the length of the reproduced selection. With this arrangement, the length of tape contained within the cartridge may be sufficient to record a selection in the order of 10 or 15 minutes in length while permitting the tape speed past the transducer head to vary by an amount in the order of 50 percent over the length of the recorded selection without introducing objectionable distortion of the reproduced signal. Accordingly, the magnetic tape cartridge may be driven by means directly engaging the hub of the reel and the advantages provided in the arrangement described in the above-identified copending Weigel application may be retained while at the same time permitting longer recorded selections in each cartridge.

In one embodiment of the present invention, the amount of tape wound on the reel during the playback operation is measured by means of a pawl and ratchet arrangement which is driven from the fly wheel of the tape playing mechanism so that a reduction in speed is achieved. This pawl and ratchet arrangement controls the movement of an arm of a potentiometer, adjustment of which functions to vary the equalization characteristic, or frequency characteristic, of the playback amplifier in which the signal reproduced from the tape is being amplified. At the end of the recorded selection, i.e., when the next magnetic tape cartridge is selected for playing, the potentiometer is returned to its initial position and hence restores a predetermined frequency characteristic at the start of playing of each magnetic tape cartridge.

In a further embodiment of the present invention, the amount of tape wound on the driving reel of each magnetic tape cartridge is measured by providing a feeler mechanism which is biased into engagement with the tape in the particular cartridge which is being played. As the tape is wound on the driving reel, this feeler mechanism is moved in accordance with tape buildup on the driving reel and movement of this feeler mechanism is employed to adjust a potentiometer which controls the frequency characteristic of the playback amplifier, as described above. Facilities are provided for withdrawing the feeler mechanism whenever the reproducing head is moved out of engagement with the tape in a particular cartridge so as to permit automatic changing of cartridges or the removal of a magazine containing a number of cartridges.

The invention, both as to its organization and method of operation, together with further objects and advantages thereof, will best be understood by reference to the following specification taken in connection with the accompanying drawings in which.

Figure 1:
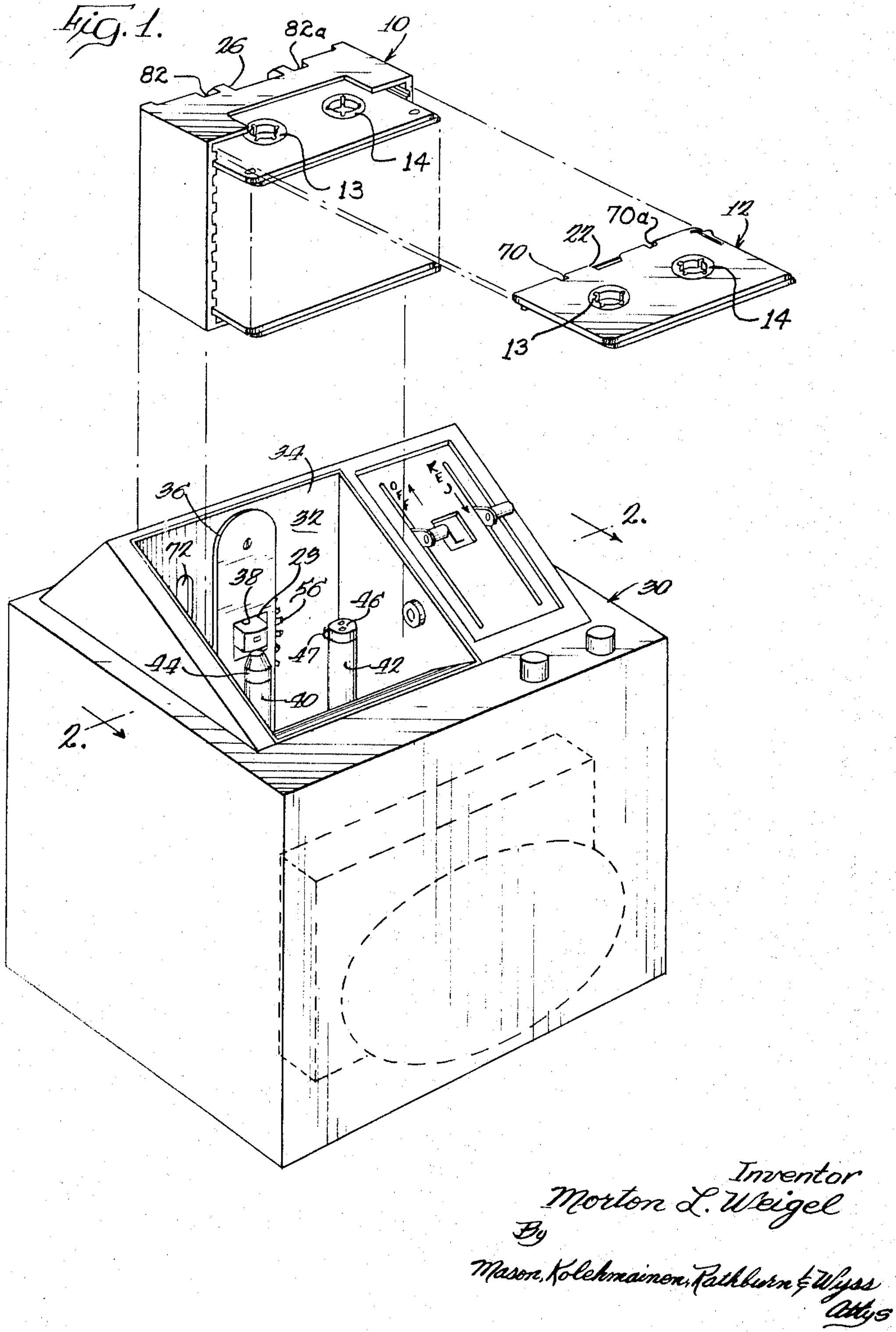
FIG. 1 is a perspective view of an automatic tape cartridge mechanism illustrating the manner in which a magazine of tape cartridges can be inserted into the mechanism, and wherein the arrangement for compensation in change of speed during playback is provided in accordance with the present invention.

Referring now to the drawings, and more particularly to FIGS. 1 to 6, inclusive, one embodiment of the present invention is therein illustrated as incorporated in an automatic tape cartridge changing mechanism of the type described and claimed in the above-identified copending application of Morton L. Weigel. While reference may be had to this copending application for a complete and detailed description of the automatic tape cartridge changing mechanism itself, for the purposes of the present invention it may be stated that this mechanism includes a removable magazine indicated generally at 10 within which a group of 10 magnetic tape cartridges, indicated generally at 12 may be selectively positioned in any desired order. Each of the cartridges 12 contains a pair of tape receiving flangeless reels 13 and 14 (FIG. 4) on which a length of magnetic tape 15 is wound. The top and bottom walls 16 and 17 (FIG. 5) of the cartriges 12 are each provided with a pair of spaced apertures 18 and 19 adapted to receive the hub portions of the respective reels 13 and 14 so that the reels are loosely retained for rotation within the apertures. The hub portions of the reels are provided with central apertures 20 and 21, respectively, and when a number of cartridges are positioned within the magazine 10 as shown in FIG. 1 the central apertures 20 and 21 in the reel hubs of each cartridge are positioned in vertical alignment with those in adjacent stacked cartridges.

Each of the cartridges 12 is provided with an opening 22 along one edge thereof through which the magnetic tape is accessible for playing contact with a transducer head 23 as the tape passes from one reel to the other within the cartridge.

In order to provide for automatic playing of the tapes within the cartridges 12 in rapid succession, the magazine 10 is provided with a vertically extending slot or opening 26 in the rear wall thereof which is generally in alignment with the notches 22 of the cartridges 12 so that the magnetic tapes in the respective cartridges are accessible from the rear of the magazine 10.

The mechanism for automatically changing from one cartridge to another in the magazine 10 is indicated generally at 30 in FIG. 1 and includes means defining a magazine receiving well 32, within which the magazine 10 is adapted to be inserted with either one of two orientations so as to permit the playing of a tape within a particular cartridge in either direction. The well 32 is provided with a rear wall 34 having a guide flange 36 formed therein and the edges of the slot 26 in the magazine 10 are arranged to engage the side edges of the flange 36 so that the magazine 10 is properly guided when inserted into the well 32. The transducer head 23 may be inserted into or withdrawn from an opening 38 formed in the flange 36 so that the head 23 may be moved into engagement with the magnetic tape in a particular cartridge, as shown, for example, in FIG. 4 of the drawings.

Within the well 32, there is provided a pair of vertically extending guide sleeves 40 and 42 which are spaced apart by an amount corresponding to the separation of the reels 13 and 14 within the cartridges 12, these guide sleeves being of slightly smaller diameter than the central apertures 20 and 21 in the cartridge reels. The sleeve 40 is provided with a stationary top portion 44 which acts to center the corresponding cartridge reel, and the sleeve 42 is provided with a rotatable drive head 46 which is arranged to enter the central aperture 20 of the corresponding tape reel of a particular cartridge 12. The drive head 46 is provided with a depressable drive lug 47 which is arranged to enter one of several spaced grooves 48 provided in the hubs of the reels 13 and 14 so that as the drive head 46 rotates the lug 47 drivingly engages a reel 14 and rotates the same so that the tape 15 is wound upon the reel 14 and is unwound from the reel 13. The drive head 46 is of a thickness substantially equal to the thickness of one of the cartridges 12 so that when a cartridge is positioned with one of its reel hubs in alignment with the drive portion 46, only this reel of the selected cartridge is driven by engagement of the lug 47 therewith in the manner described.

The drive head 46 is connected to a motor driven fly wheel 50 (FIGS. 2 and 3) except during the automatic tape changing cycle so that during the tape playing cycle the tape 15 of a selected cartridge is continuously wound on the reel 14. Because the fly wheel 50 is rotated at a constant speed, it will be evident that the speed of the tape as it moves past the transducer head 23 continuously increases from one end of the tape to the other due to the buildup of tape on the reel 14 during the playing cycle.

Figure 3:
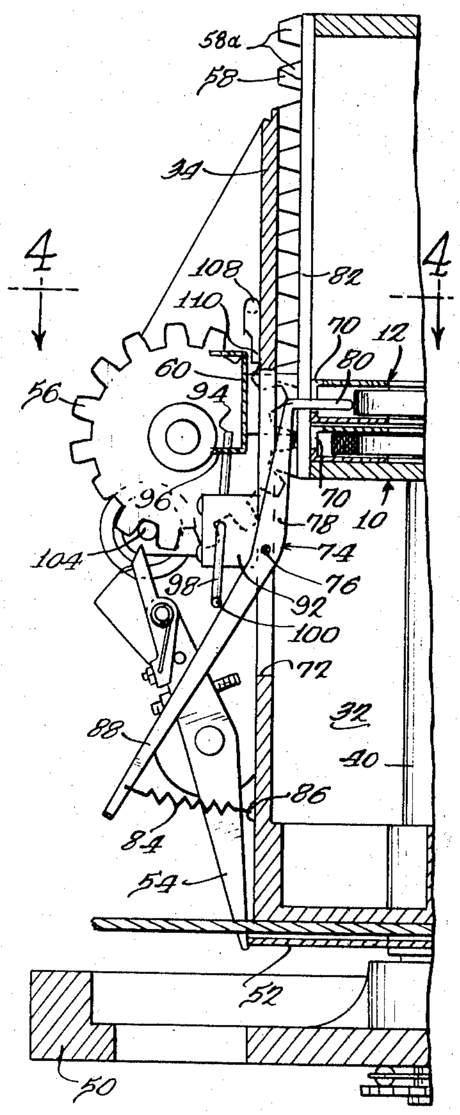
FIG. 3 is a sectional view taken along the lines 3—3 of FIG. 2.
Figure 4:
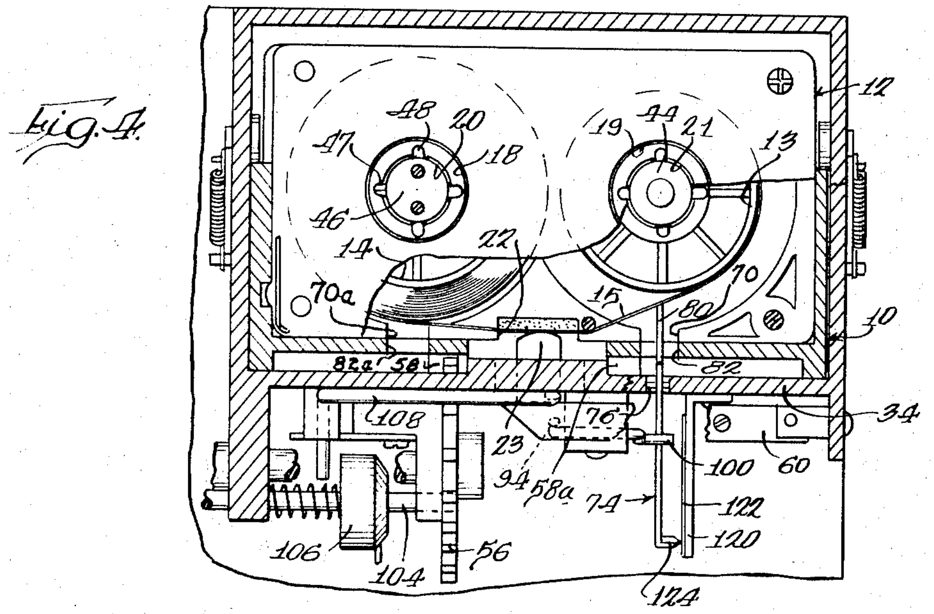
FIG. 4 is a sectional view taken along the lines 4—4 of FIG. 3 and showing the manner in which the feeler mechanism of the present invention engages the tape within one of the magnetic tape cartridges.
Figure 5:
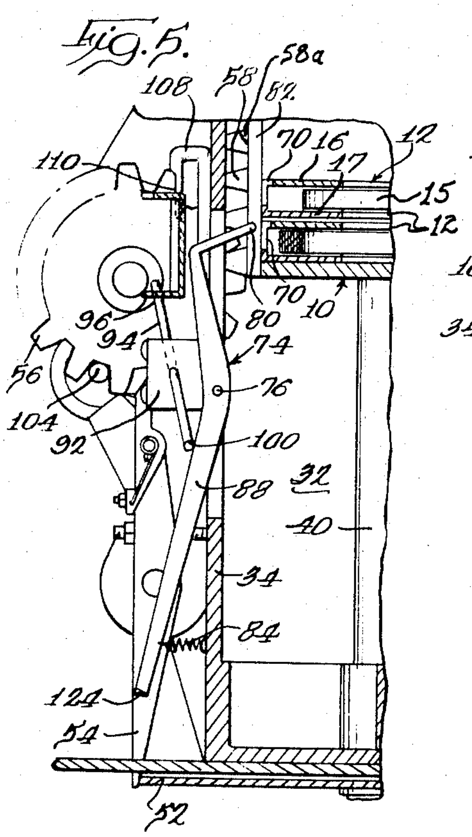
FIG. 5 is a sectional view similar to FIG. 3 but showing the feeler mechanism in position for withdrawal of the magnetic tape cartridge magazine.
Figure 6:
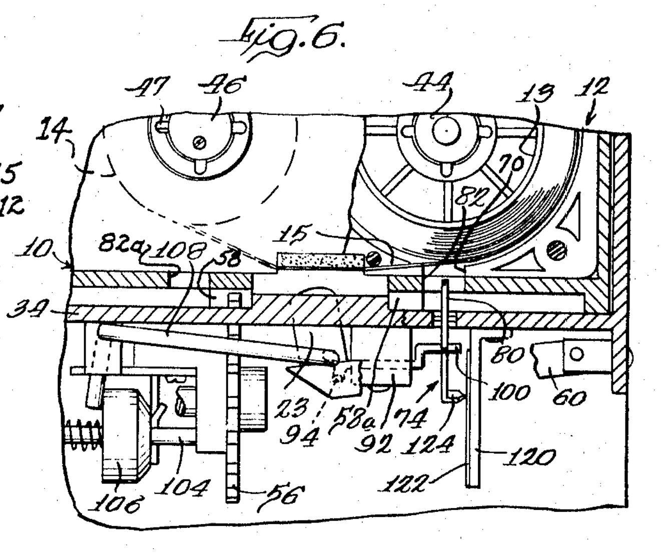
FIG. 6 is a fragmentary sectional view similar to FIG. 4 but showing the feeler mechanism in withdrawn position.

When an automatic tape changing cycle is initiated, a cam plate 52 is rotated one revolution and functions to move a pivotally mounted lever 54 from the position shown in FIG. 3 to the position shown in FIG. 5 and then permits return of the lever to the position shown in FIG. 3. The movement of the lever 54 produces an incremental rotation of a gear 56, the teeth of which engage corresponding teeth 58 arranged in a vertical row or rack on the rear wall of the magazine 10. Incremental movement of the gear 56 by the lever 54 causes the magazine to be lifted upwardly within the well 32 to a level wherein the transducer head 23 can engage the tape in the next lower cartridge 12 in the magazine. The transducer head 23 is carried on a pivotally mounted bracket 60, and prior to lifting of the magazine 10 within the well, the head is moved outwardly from the position shown in FIG. 4 to the position shown in FIG. 6 permitting the cartridges 12 to be moved upwardly within the well 32 without damage to the magnetic tape contained therein.

Considering now the arrangement of the present invention whereby the above-described automatic tape cartridge changing mechanism is adapted to provide compensation for the above-described change in tape speed during playback of the recorded selection, in the embodiment of FIGS. 1 to 6, inclusive, each of the cartridges 12 is provided with a slot 70 in the rear edge of the cartridge and on the left-hand side of the central tape opening 22 of the cartridge 12 (as viewed in FIG. 1). The rear wall 34 of the magazine receiving well 32 is provided with a vertically extending slot or opening 72 to accommodate a lever 74 which is pivotally mounted on a pin 76 extending transversely across the slot. The lever 74 includes an upper arm portion 78 and a right-angle feeler probe portion 80 which is adapted to extend into the opening 70 of a particular cartridge in the magazine 10 positioned in playing position, i.e., with the reel 14 thereof in operative engagement with the drive head 46. In order to permit movement of the probe 80 into each cartridge as it is being played, the magazine 10 is provided with a pair of vertical slots 82 and 82*a* in the rear wall thereof. Each slot extends vertically for the full height of the magazine 10 and the slot 82 is positioned next to an inactive row of rack teeth 58*a* (FIG. 4) while the slot 82*a* is positioned next to the rack of active teeth 58. Accordingly, the probe portion 80 may be moved through the slot 82 in the magazine 10 and through the aligned slot 70 in the active cartridge 12 to engage the magnetic tape 15 as it is being unwound from the reel 13 and wound onto the reel 14 of the cartridge. The probe portion 80 is biased into engagement with the tape by means of a coil spring 84 having one end connected to a stud 86 formed in the rear wall 34 and an opposite end connected to the lower arm portion 88 of the lever 74. Preferably, the probe portion 80 is made of nylon or other material having an extremely low coefficient of friction because the end of the probe 80 rides against the oxide side of the moving magnetic tape 15, i.e., the same side of the tape in contact with the transducer head 23.

In order to withdraw the probe portion 80 out of the slot 70 and beyond the rear edge of the active cartridge 12 so that the magazine 10 may be moved upwardly to place the next lower cartridge in playing position, movement of the lever 74 is synchronized with and controlled by movement of the pivotally mounted lever 60 which carries the transducer head 23. Accordingly, each time the transducer head 23 is moved out of engagement with the tape which is being played, the probe portion 80 of the lever 74 is also moved away from the rear edge of the active cartridge to permit upward movement of the magazine 10 within the well 32. More particularly, a control lever 90 is pivotally mounted on a bearing block 92 secured to the rear wall 34 and includes an upstanding arm portion 94 which extends through an opening in a bottom flange 96 of the pivotally mounted transducer head supporting lever 60, as best illustrated in FIGS. 2 and 3.

The lever 90 also includes a downwardly extending arm portion 98 on the other side of the bearing block 92 having a right-angle end portion 100 which bears against the lower arm portion 88 of the lever 74 below the mounting pin 76.

Figure 2:
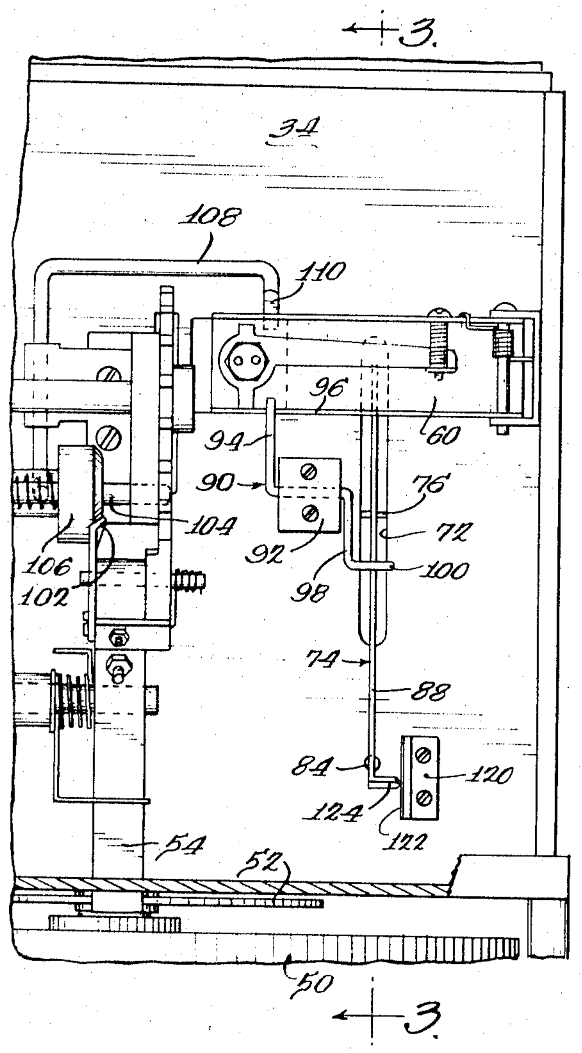
FIG. 2 is a fragmentary sectional view taken along the line 2—2 of FIG. 1 and illustrating the feeler mechanism employed to measure tape buildup in accordance with the present invention.

When the transducer head 23 is in engagement with the tape being played the lever 60 occupies the position shown in FIGS. 2, 3, and 4, and the end portion 100 of the lever 90 is not in engagement with the lower arm portion 88 of the lever 74 and, accordingly, the lever 74 can move without restraint. However, when an automatic tape cartridge changing cycle is initiated and the lever 54 is moved from the position shown in FIG. 3 to the position shown in FIG. 5, the lever 60 is pivoted outwardly to the position shown in FIG. 6 so that the transducer head 23 is moved away from the cartridge which has just been played. As described in more detail in the above-identified copending application, this movement of the lever 54 causes a flange 102 on the upper end thereof to move a shaft 104 to the left, as viewed in FIG. 2, by engagement with a hub 106 carried by the shaft. Movement of the hub 106 to the left causes pivotal movement of a control member 108 about its vertical mounting axis outwardly from the position shown in FIG. 4 to the position shown in FIG. 6. The control member includes an offset end portion 110 which engages the lever 60 and causes it to assume the position shown in FIG. 6. The outward movement of the lever 60 to the position of FIG. 6 in turn causes the control lever 90 to pivot within the bearing block 92 so that the arm portion 100 thereof engages the lever 74 and moves this lever to the position shown in FIG. 5 against the force of the compression spring 84. When the lever 74 is in the position shown in FIG. 5, the probe portion 80 thereof is moved into the vertical slot 82 provided in the magazine 10 and is retracted from the rear edge of the active one of the cartridges 12. Accordingly, the magazine 10 is thus free for movement upwardly within the well 32 to place the next lower cartridge in the magazine playing position.

When the end of the automatic tape changing cycle is completed the lever 108 is returned to its initial position with the result that the transducer head 23 is moved into engagement with the tape in the new cartridge and because the lever 90 is then moved to its normal position shown in FIG. 3, the probe portion 80 of the feeler lever 74 is free to move into the opening 70 of the new cartridge and engage the tape therein. Because all of the tape is wound on the reel 13 at the start of the playing cycle, the tape will occupy the position shown in FIG. 6, and the end of the probe portion 80 will move into engagement with the tape in this position. As the tape is played the probe portion 80 will move inwardly continuing to ride on the diminishing reel of tape as it is unwound so that movement of the lever 74 is a measure of the amount of tape which is unwound from the reel 13 and which is at the same time being wound on the reel 14.

The above-described movement of the lever 74 is used to vary the impedance of an electrical impedance element in order to provide electrical compensation for the change in tape speed as each cartridge is played. For this purpose a wire wound resistance card 122 is mounted on a bracket 120 secured to the rear wall 34. The lever 74, which is preferably of plastic or other insulating material, includes a right-angle end portion 124 at the lower end thereof which preferably is made of highly conductive metal. The tip of the end portion 124 is provided with a wiper point suitable for engaging the resistance card 122 at various locations along its surface as the lever 74 is moved in accordance with the tape buildup on the reel 13.

In order to utilize the above-described movement of the wiper point over the resistance card 122 to provide tape speed compensation, the resistance element 122 may be employed to vary the amount of feedback between amplifier stages in a playback preamplifier.

Figure 9:
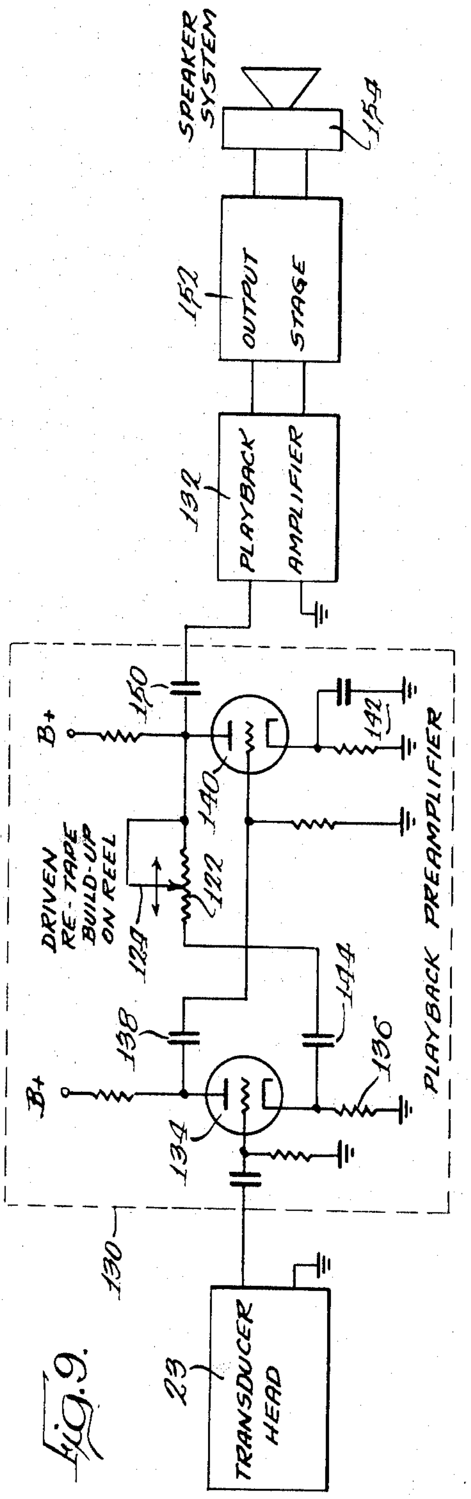
FIG. 9 is a schematic diagram of a suitable electrical circuit arrangement which may be employed to provide compensation for change in tape speed in accordance with the present invention.

Thus, referring to FIG. 9, the output of the transducer head 23 may be connected to a suitable preamplifier 130, the output of which ils supplied to the main playback amplifier indicated generally at 132. More particularly, feedback from the output stage of the preamplifier 130 is supplied to the cathode bias resistor 136 of a first triode amplifier stage 134. The output of the amplifier stage 134 is coupled through a capacitor 138 to the input of a second or output triode amplifier stage 140 which is biased by a suitable cathode biased network 142. The output from the plate of the stage 140 is fed back to the resistor 136 of the first stage through the resistance element 122 and through a small capacitor 144. Because the capacitor 144 is small, it will provide more degenerative feedback at the higher frequencies and hence will reduce the gain in the high frequency range depending upon the adjustment of the resistance element 122. The output of the stage 140 is coupled through a capacitor 150 to the main playback amplifier 132 having a suitable output stage 152 for driving a speaker system 154.

Figure 10:
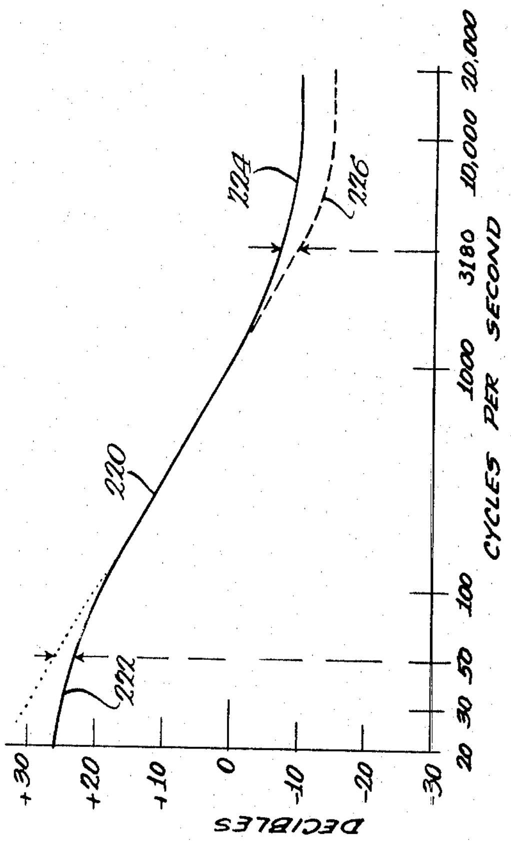
FIG. 10 is a graph representing the chrange in equalization of the magnetic tape playback amplifier of FIG. 9 during the tape playing cycle.

In considering the change in frequency characteristic to be effected by varying the effective resistance of the element 122 in the feedback circuit, there is shown in FIG. 10 a characteristic equalization curve for a magnetic tape playback amplifier.

Referring to FIG. 10, the intermediate portion 220 of the curve has a slope of 6 db per octave which compensates for the rising frequency response characteristic of the playback head itself. At the low frequency end of the curve 222, the deviation from a 6 db per octave slope is changed so that at approximately 50 cycles per second the deviation from a straight line is approximately 3 db. On the other hand, deviation is provided at the high frequency end of the curve 224, for example, at a high frequency turnover point of approximately 3,180 cycles a 3 db increase is normally provided. The correct equalization curve corresponding to the initial speed of the tape at the start of the playing cycle is provided with the resistance element 122 in its initial position, i.e., when the probe 80 engages the full reel of tape on the reel 13. As the tape is wound on the reel 14, the probe 80 moves inwardly and the resistance element 122 is adjusted so that the reproduction level of the upper or high frequency components of the recorded selection are reduced and at the end of the playing cycle the high frequency end of the characteristic has been modified as indicated by the dotted line 226. However, it will be understood that since the new characteristic 226 is one in which the tape is being moved past the transducer head 23 at an increased rate of speed, the overall equalization curve for the playback unit will remain essentially constant, i.e., that of a standard equalization curve for tape playback amplifiers.

Considering now the operation of the tape speed compensation system described heretofore, when the probe 80 is first moved into engagement with the tape 15, the tape is moving at a relatively slow speed and hence the equalization curve for the preamplifier 130, the playback amplifier 132 and the output stage 152 must be such as to provide a suitable curve for correct frequency response which will compensate for the 6 db per octave rising characteristic of the transducer head 23 itself, as will be readily understood by those skilled in the art. Accordingly, the circuit constants of the preamplifier 130 and amplifier 132 are suitably chosen so as to provide a standard equalization curve at the initial tape speed at which the tape moves past the transducer head 23 at the start of playing of a particular cartridge. As the tape builds up on the reel 14 the speed of the tape past the transducer head 23 increases since the reel 14 is driven at a constant speed, as described heretofore. This increase in tape speed results in an accentuated response for the high frequency components recorded on the tape if no compensation is provided, the maximum percentage change in tape speed is limited to perhaps 25 percent of its initial value, as described in detail in the above-identified copending application.

In accordance with the present invention, movement of the probe 80 as the tape is wound on the reel 14 is employed to produce a variation in the resistance element 122 in such manner that the high frequency components of the selection being reproduced are progressively reduced as the selection is played so that the equalization curve of the playback amplifiers remains substantially correct for the instantaneous tape speed at which the selection is being played. In this connection it will be understood that the resistance card 122 may be wound with a suitable non-linearity along its length so that movement of the wiper point on the arm 124 over the range of movement of the probe 80 provides the desired change in frequency characteristic during playback. In this connection, it will be understood that the wiper point of the arm 124 is moved inwardly toward wall 34 to the position shown in FIG. 5 when the lever 74 is withdrawn to permit selection of a new cartridge. However, this extreme position of the wiper point is not employed to provide tape speed compensation because the lever 74 is first permitted to move inwardly and engage the tape 15 before the playback operation is started. Accordingly, it is only movement of the wiper point along a selected intermediate portion of the resistance card which is utilized to vary the frequency characteristic of the playback amplifier and provide tape-speed compensation. It will also be understood in this connection, that the initial position of the probe 80 is dependent upon the amount of tape wound on the reel 13 at the start of the playback operation, and, accordingly, each of the cartridges 12 is preferably provided with the same amount of tape on the reels thereof so that the wiper arm 124 will occupy approximately the same position on the resistance card 122 at the start of each tape cartridge playing operation. However, because the compensation provided by adjustment of the resistance element 122 is made over a number of minutes and also because of the fact that the average listener cannot detect slight variations in the reproduced level of the high frequency components of the selection being played, considerable variation in the initial position of the wiper arm 124 may be tolerated, the important point being that a continuous reduction in the level of the high frequency components of the reproduced selection is achieved as playing of the tape within each cartridge progresses.

As previously described, the tape magazine 10 includes a pair of slots 82 and **82*a*, as well as a pair of teeth racks 58 and 58*a*, on the rear wall thereof. Each cartridge 12 includes an opening 70 to permit the probe 80 to sense the amount of tape on the reel 13 contained therein. In addition, each cartridge includes an opposite opening 70*a* adjacent the reel 14 therein to permit the probe 80 also to sense the amount of tape on the reel 14** when the cartridges are turned over.

After all of the cartridges stacked in a magazine have been played, the tape 15 of each cartridge is wound on the reel 14 therein as illustrated in FIG. 4. The magazine can then be turned over and again inserted into the well 32 for playing. When this is done the reels 13 of the cartridges are the driven reels and the tape unwinds from the reels 14 and is again wound on the reels 13. Preferably, the tapes are two or four track tapes so that two selections can be recorded on each tape, one selection being played as the tape moves from reel 13 to reel 14 and the other selection being played as the tape moves from reel 14 to reel 13. When the magazine is in the turned over position within the well 32, the gear 56 engages the teeth in the rack **58*a* and the probe 80 extends through the slot 82*a* in the magazine wall and into the cartridges through the openings 70*a***.

Figure 7:
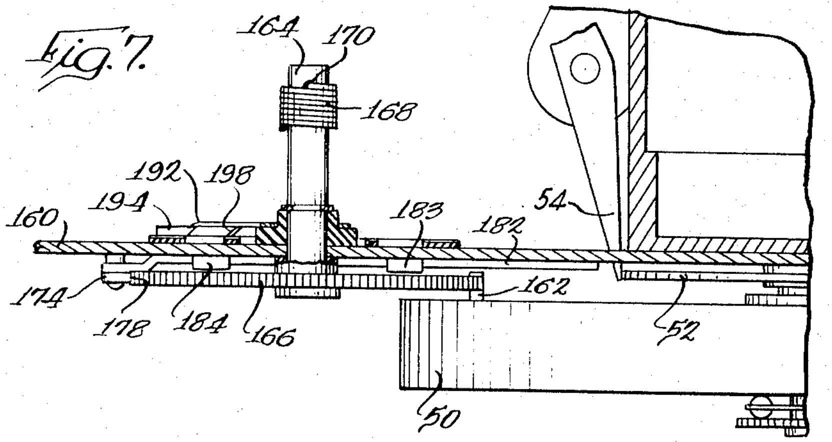
FIG. 7 is a side elevational view of an alternative embodiment of the present invention wherein compensation for change in tape speed is achieved by means directly actuated from the fly wheel of the automatic tape changing mechanism.
Figure 8:
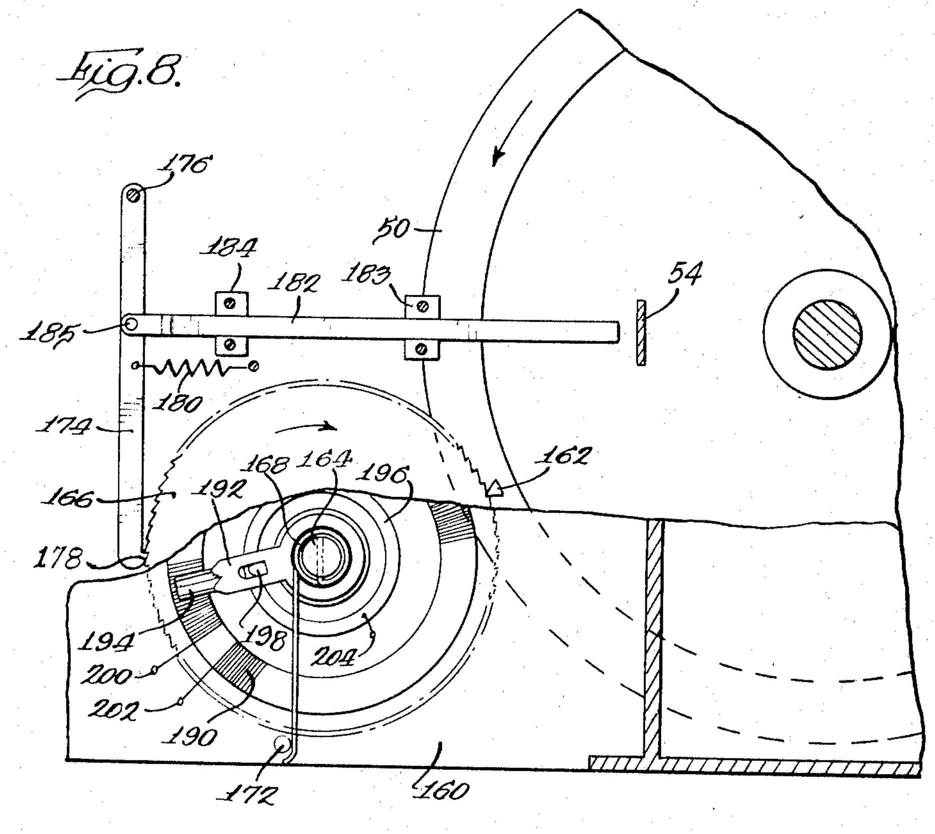
FIG. 8 is a plan view of the alternative embodiment of FIG. 7.

In FIGS. 7 and 8 of the drawings, there is shown an alternative embodiment of the invention wherein compensation for tape speed is provided.

Referring to these figures, the fly wheel 50, which is positioned below a deck 160 in the automatic tape cartridge changing mechanism 30 is provided with an upstanding pin 162 in the rim portion thereof. An upstanding shaft 164 is rotatably mounted on the deck 160, and a fine-toothed ratchet wheel 166 is mounted on the lower end of the shaft 164 below the deck 160. The ratchet wheel 166 is provided with a large number of fine teeth around its periphery, the number of teeth depending upon certain factors to be described in more detail hereinafter, and is positioned so that the pin 162 engages one of the teeth of the ratchet wheel 166 as the fly wheel rotates. Preferably, the pin 162 is wedge-shaped to provide a sharp edge which will engage only a single tooth on the ratchet wheel 166 and moves the ratchet wheel 166 a small increment for each rotation of the fly wheel 50. The ratchet wheel 166 is biased to an initial position by means of a coil spring 168 the upper end of which is connected to the upper end of the shaft 164, as indicated at 170, and the bottom end of which extends at a right angle away from the shaft 164 and is restrained by a pin 172. Accordingly, as the ratchet wheel is rotated by engagement of the pin 162 with one of the teeth thereon, the spring 168 is wound up. In order to restrain the ratchet wheel against rotation between successive engagements of the pin 162 with the teeth thereon, there is provided a pawl member 174 which is pivotally mounted to the under side of the deck 160 by means of a pin 176. The pawl includes a laterally projecting lug 178 at one end thereof which is biased into engagement with the teeth of the ratchet wheel 166 by means of the coil spring 180.

With this arrangement, when the fly wheel rotates during the playing cycle of a particular magnetic tape cartridge, the pin 162 engages the teeth of the ratchet wheel 166 and rotates this wheel in slight increments so that the wheel is rotated somewhat less than one full revolution during the entire recorded selection. The pawl 174 functions to hold the ratchet wheel after each incremental rotary movement thereof by the pin 162 so that the spring 168 is prevented from returning the ratchet wheel 166 to its initial position throughout the playing cycle. When a magnetic tape cartridge changing cycle is initiated, the cam 52 moves the control lever 54 in the manner described heretofore in connection with the embodiment of FIGS. 1 to 6, inclusive, the lower tip of the lever engages the end of a push rod 182 which is mounted for axial sliding movement in a pair of brackets 183 and 184 secured to the underside of the deck 160. The outer end of the push rod 182 is pivotally connected to the pawl 174 by a pin 185, and when the control lever 54 is moved outwardly in the manner described heretofore during the tape changing cycle, it engages the end of the push rod 182 to pivot the pawl 174 and lug 178 away from the teeth on the ratchet wheel 166. As this occurs the spring 168, which has been wound up during the playing cycle, functions to return the ratchet wheel 166 and the control shaft 164 to their initial positions. At the end of the tape changing cycle, the control member 54 is moved back to the position shown in FIG. 7 and the spring 180 functions to again bias the lug 178 at the end of the pawl 174 into engagement with the teeth of the ratchet wheel 166. As a result, the control shaft 164 is returned to the same initial position which it had at the beginning of the previous tape playing cycle.

In order to provide a variable impedance which is continuously adjusted in accordance with the above-described rotary movement of the shaft 164, a variable impedance element in the form of an annular ring of resistive material 190 is mounted on an annular base member of insulating material which is secured to the upper surface of the deck 160. The resistance element 190 may comprise either a wire wound resistance in annular form or any suitable resistance composition material, as will be readily understood by those skilled in the art. Attached to the control shaft 164 is a wiper arm 192 having a wiper point 194 at the outer end adapted to engage and ride upon the upper surface of the resistance element 190. A circular conductive ring 196 is mounted on the deck 160 in insulated relation thereto and is positioned concentrically about the shaft 164. The wiper arm 192 is formed of conductive material and includes a second wiper point 198 which rides on the conductive ring 196. Terminals 200 and 202 are connected to the outer ends of the resistance element 190 and a terminal 204 is connected to the conductive ring 196 thus providing a variable impedance element which is adjusted in accordance with the number of rotations of the fly wheel 50 during a tape playback cycle. The number of rotations of the fly wheel completed at any given instant during a playback cycle corresponds to the number of rotations of the reel within the tape cartridge which is being played.

The variable resistance element described may be employed in a suitable circuit arrangement such as that shown in FIG. 9, wherein it is substituted for the impedance element 122 and is employed to change the playback compensation characteristic of the amplifier 132 during the tape playing cycle. In this connection, it is pointed out that variation of the resistance 190 is substantially uniform throughout the tape playing cycle due to the fact that the ratchet wheel 166 is moved by the fly wheel 50 which is rotated at a constant speed. On the other hand, in the embodiment of FIGS. 1 to 6, inclusive, the adjustment of the impedance element 122 is somewhat non-uniform since the probe portion 80 measures the actual buildup of the tape on the reel 14. Accordingly, the probe portion 80 moves inwardly at a somewhat increasing rate as the tape buildup increases on the reel 14 and decreases on the reel 13 and hence the adjustment of the element 122 will be at a slightly faster rate at the end of the tape playing cycle. It is also pointed out that in the embodiment of FIGS. 7 and 8 the wiper arm 192 is always returned to the same starting point by the spring 168 and the length of tape which is wound on the reel of the magnetic tape cartridge during the playing cycle may vary considerably.

Thus, as long as the wiper arm 192 is not moved off of the extreme end of the resistance element 190 connected to the contact 202, a continuous correction for change in tape speed is provided. Of course, the number of teeth on the ratchet wheel 166 must be correlated with the speed of the fly wheel 50 so as to accommodate the maximum length of tape to be used. For example, if the fly wheel 50 rotates at a speed of 50 r.p.m. and the wheel 166 has 250 teeth, the maximum tape length will be limited to somewhat under 5 minutes, assuming that the wheel 166 is moved one tooth increment each revolution of the fly wheel 50. In the event a longer length of tape is to be played, it may be desirable to provide additional speed reduction between the actuating pin 162 and the control shaft 164, as will be readily understood by those skilled in the art. In the alternative, a larger wheel 166 with more teeth may be employed.

While there have been illustrated and described various embodiments of the present invention, it will be apparent that various changes and modifications thereof will occur to those skilled in the art.

What is claimed as new and desired to be secured by Letters Patent of the United States is:

1. In an apparatus for playing a magnetic tape cartridge of the type having a housing and first and second reels contained within said housing on which a length of magnetic tape is wound, a transducer head, means for moving said head into engagement with said tape intermediate said reels, means for driving one of said reels so as to wind said tape onto said one reel from the other of said reels, whereby the speed of said tape past said head continuously increases as said tape is wound on said one reel, means for developing an electrical signal from said transducer head corresponding to the material recorded on said tape, a control member, means for positioning said member in a predetermined position, means for moving said member away from said predetermined position in correlation with said reel driving means, means responsive to movement of said control member for varying said electrical signal to provide compensation for said change in speed of said tape as it moves past said transducer head, and means for automatically returning said control member to said predetermined position when the end of said tape is reached.

2. In an apparatus for playing a magnetic tape cartridge of the type having a housing and first and second reels contained within said housing on which a length of magnetic tape is wound, a transducer head, means for moving said head into engagement with said tape intermediate said reels, means for driving one of said reels so as to wind said tape onto said one reel from the other of said reels, whereby the speed of said tape past said head continuously increases as said tape is wound on said one reel, means for developing an electrical signal from said transducer head corresponding to the material recorded on said tape, a control member, means for positioning said member in a predetermined position, means for initiating movement of said control member away from said predetermined position when said head is moved into engagement with said tape and at a rate correlated with said reel driving means, means responsive to movement of said control member for varying said electrical signal to provide compensation for said change in speed of said tape as it moves past said transducer head, and means for automatically returning said control member to said predetermined position when the end of said tape is reached.

3. In an apparatus for playing magnetic tape cartridge of the type having a housing and first and second reels contained within said housing on which a length of magnetic tape is wound, a transducer head, means for moving said head into engagement with said tape intermediate said reels, means for driving one of said reels so as to wind said tape onto said one reel from the other of said reels, whereby the speed of said tape past said head continuously increases as said tape is wound on said one reel, amplifier means for developing an electrical signal from said transducer head corresponding to the material recorded on said tape, a control member, means for positioning said member in a predetermined position, means for initiating movement of said control member away from said predetermined position when said head is moved into engagement with said tape and at a rate correlated with said reel driving means, means responsive to movement of said control member for varying the frequency characteristic of said amplifier means, thereby to provide at least partial compensation for said change in speed of said tape as it moves past said transducer head, and means for automatically returning said control member to said predetermined position when the end of said tape is reached.

4. In an apparatus for playing a magnetic tape cartridge of the type having a housing and first and second reels contained within said housing on which a length of magnetic tape is wound, a transducer head, means for moving said head into engagement with said tape intermediate said reels, means for driving one of said reels so as to wind said tape onto said one reel from the other of said reels, whereby the speed of said tape past said head continuously increases as said tape is wound on said one reel, means for developing an electrical signal from said transducer head corresponding to the material recorded on said tape, a control member, means for moving said control member into engagement with said tape in timed relation to movement of said head into engagement with said tape, whereby said control member measures the amount of tape wound on said one reel while said head is in engagement with said tape, and means reponsive to movement of said control member for varying said electrical signal to provide at least partial compensation for said change in speed of said tape.

5. In an apparatus for playing a magnetic tape cartridge of the type having a housing and first and second reels contained within said housing on which a length of magnetic tape is wound, a transducer head, means for moving said head into engagement with said tape intermediate said reels, means for driving one of said reels so as to wind said tape onto said one reel from the other of said reels, whereby the speed of said tape past said head continuously increases as said tape is wound on said one reel, means for developing an electrical signal from said transducer head corresponding to the material recorded on said tape, a control member, means for moving said control member into engagement with said tape in timed relation to movement of said head into engagement with said tape, whereby said control member measures the amount of tape wound on said one reel while said head is in engagement with said tape, means responsive to movement of said control member for varying said electrical signal to provide at least partial compensation for said change in speed of said tape, means for moving said head out of engagement with said tape after said tape has been wound on said one reel, and means for moving said control member away from said tape in timed relation to said last named movement of said head.

6. In an apparatus for playing a magnetic tape cartridge of the type having a housing and first and second reels contained within said housing on which a length of magnetic tape is wound, a transducer head, means for moving said head into engagement with said tape intermediate said reels, means for driving one of said reels so as to wind said tape onto said one reel from the other of said reels, whereby the speed of said tape past said head continuously increases as said tape is wound on said one reel, means for developing an electrical signal from said transducer head corresponding to the material recorded on said tape, a control member, means for moving said control member into engagement with said tape in timed relation to movement of said head into engagement with said tape, whereby said control member measures the amount of tape wound on said one reel while said head is in engagement with said tape, means responsive to movement of said control member for varying said electrical signal to provide at least partial compensation for said change in speed of said tape, means for moving said head out of engagement with said tape after said tape has been wound on said one reel, and means for moving said control member outwardly beyond the edge of said cartridge in timer relation to said last named movement of said head, thereby to permit the playing of a number of such cartridges in succession.

7. An apparatus for automatically playing magnetic tape cartridges, comprising a plurality of magnetic tape cartridges each containing a pair of reels on which a length of magnetic tape is wound, each of said reels having a central aperture therein and said cartridges having openings therein providing access to said central apertures, a positioning shaft, a driveshaft spaced from said positioning shaft by an amount equal to the spacing of said reels within each of said cartridges, said driveshaft having means adapted to interlock with the central aperture of any one of said reels, means for positioning said plurality of cartridges in spaced relation with said positioning shaft extending into the central aperture of one reel of one of said cartridge and said driveshaft extending into the other reel of said one cartridge with the interlocking means thereof adapted to drive said other reel, means for causing relative movement between said plurality of cartridges and said driveshaft so that said interlocking means is successively moved into engagement with different ones of said other reels of said plurality of cartridges to drive the same, a transducer head, means for successively engaging said head with different ones of said magnetic tapes as each tape is driven by said driveshaft, whereby the speed of each tape past said head continuously increases as the tape is wound on one of said reels, means for developing an electrical signal from said transducer head corresponding to the material recorded on the tape, means for automatically measuring the amount of tape wound on said one reel as the tape is driven by said driveshaft, and means responsive to said last named means for varying said electrical signal to provide compensation for said change in speed of the tape.

8. An apparatus as claimed in claim 7, wherein each of said cartridges is provided with an opening in one edge thereof and said measuring means includes a pivotally-mounted control member, and means for moving said control member through said opening in the cartridge and into engagement with the tape therein in timed relation to movement of said head into engagement with the tape contained in the same cartridge.

9. An apparatus as claimed in claim 7, wherein each of said cartridges is provided with an opening in one edge thereof and said measuring means includes a pivotally-mounted control member, means for moving said control member through said opening in the cartridge and into engagement with the tape therein in timed relation to movement of said head into engagement with the tape contained in the same cartridge, and means for retracting said control member beyond the edge of the cartridge after the tape contained therein has been played, thereby to permit said relative movement between said plurality of cartridges and said driveshaft.

References Cited

UNITED STATES PATENTS

| | | | |
|---|---|---|---|
| 2,239,042 | 4/1941 | Kleber | 179—100.4 |
| 2,320,429 | 6/1943 | Hasbrouck | 179—100.4 |
| 2,528,457 | 10/1950 | Stone | 179—100.4 |
| 3,120,356 | 2/1964 | Zahner | 242—55.12 |
| 3,137,767 | 6/1964 | Axon | 242—55.12 |

BERNARD KONICK, *Primary Examiner.*

J. RUSSELL GOUDEAU, *Assistant Examiner.*